United States Patent [19]
Rautenbach

[11] Patent Number: 5,718,479
[45] Date of Patent: Feb. 17, 1998

[54] CONVERTIBLE SEATING ARRANGEMENT

[75] Inventor: Marthinus Wessel Rautenbach, Pretoria, South Africa

[73] Assignee: Ecosat (Proprietary) Limited, Pretoria, South Africa

[21] Appl. No.: 597,397

[22] Filed: Feb. 8, 1996

[30] Foreign Application Priority Data

Feb. 9, 1995 [ZA] South Africa ............... 95/1027

[51] Int. Cl.[6] ............................................. B60N 2/02
[52] U.S. Cl. ......................... 297/354.13; 297/353; 297/94
[58] Field of Search ........................... 297/354.13, 337, 297/343, 283.1, 283.2, 283.3, 92, 94, 353, 101; 5/37.1, 39

[56] References Cited

U.S. PATENT DOCUMENTS

| | | | |
|---|---|---|---|
| 219,697 | 9/1879 | Dare | 297/354.13 X |
| 1,429,368 | 9/1922 | Owler et al. | 297/283.1 X |
| 1,936,973 | 11/1933 | Switzer | 297/354.13 |
| 2,334,934 | 11/1943 | Karsakov et al. | 297/354.13 X |
| 2,712,344 | 7/1955 | Weber | 297/354.13 |
| 3,934,932 | 1/1976 | Ekornes | 297/354.13 X |
| 3,986,218 | 10/1976 | Mizelle . | |
| 4,415,201 | 11/1983 | Wang | 297/94 X |
| 4,620,335 | 11/1986 | Dodgen . | |
| 4,625,346 | 12/1986 | Quackenbush . | |
| 4,639,953 | 2/1987 | McElmurry et al. . | |
| 4,642,823 | 2/1987 | Wiggins . | |
| 4,731,888 | 3/1988 | Bridges . | |
| 5,303,432 | 4/1994 | Fitts . | |

FOREIGN PATENT DOCUMENTS

| | | | |
|---|---|---|---|
| 570824 | 12/1957 | Italy | 297/283.2 |
| 593283 | 10/1947 | United Kingdom . | |
| 887038 | 1/1962 | United Kingdom . | |
| 2098469 | 11/1982 | United Kingdom . | |

*Primary Examiner*—Milton Nelson, Jr.
*Attorney, Agent, or Firm*—Birch, Stewart, Kolasch & Birch, LLP

[57] ABSTRACT

A convertible seating arrangement can be configured either as a seat or as a bed. The arrangement includes a frame which supports a seat member on a track, and a back member on a pair of pivoting arms. The seat member can slide fore and aft on the track, while the back member can rotate through 180° on the arms and be locked in position thereon. With the seat member extended forwardly and the arms oriented upright, the arrangement functions as a conventional seat. The seat member can be retracted, and the back member is rotated through 180° on the arms and locked into its new position before being lowered to lie adjacent to and coplanar with the seat member to define a bed. A pair of the seating arrangements can be located facing one another and spaced apart to define a relatively large sleeping surface.

15 Claims, 6 Drawing Sheets

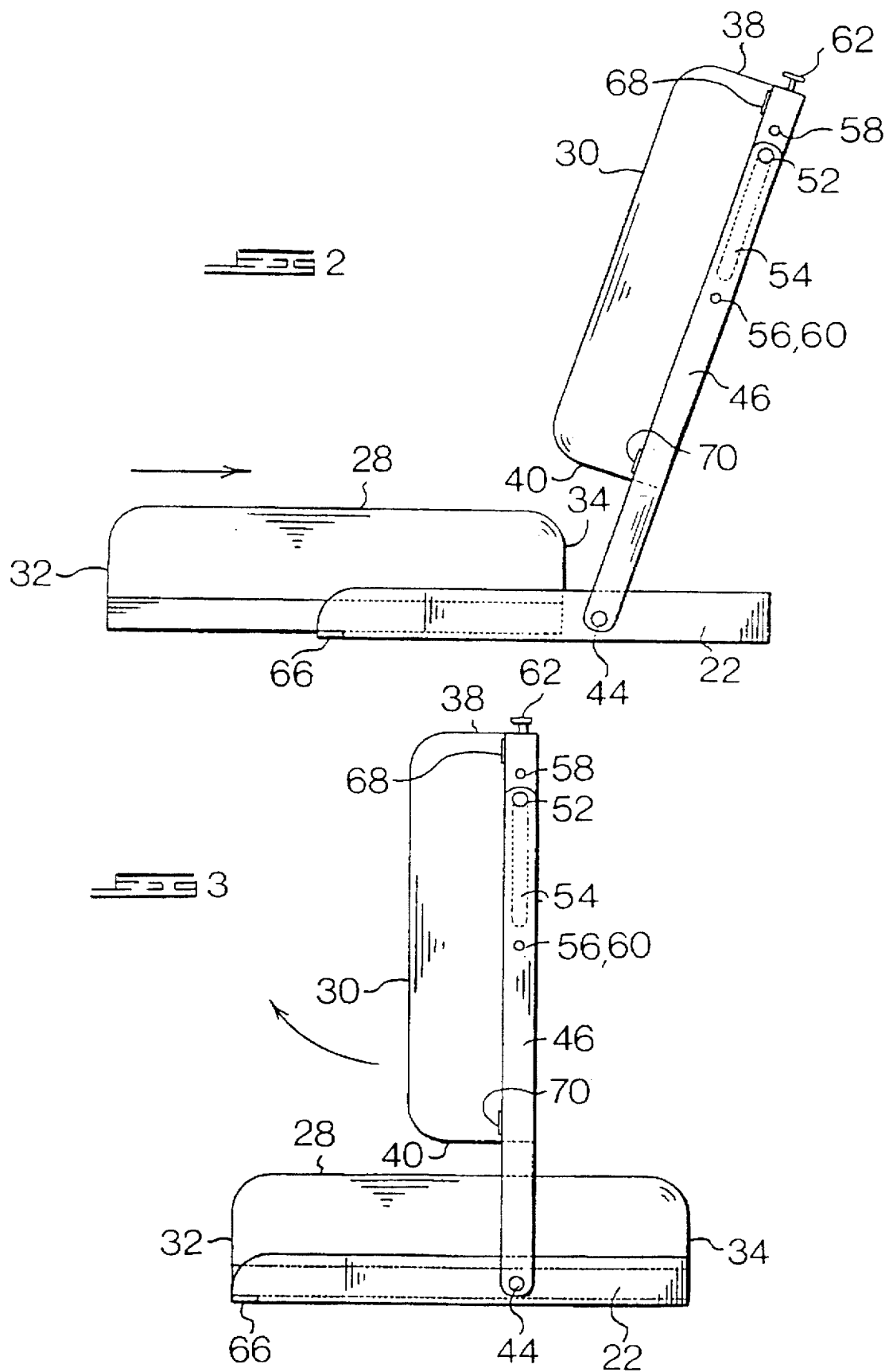

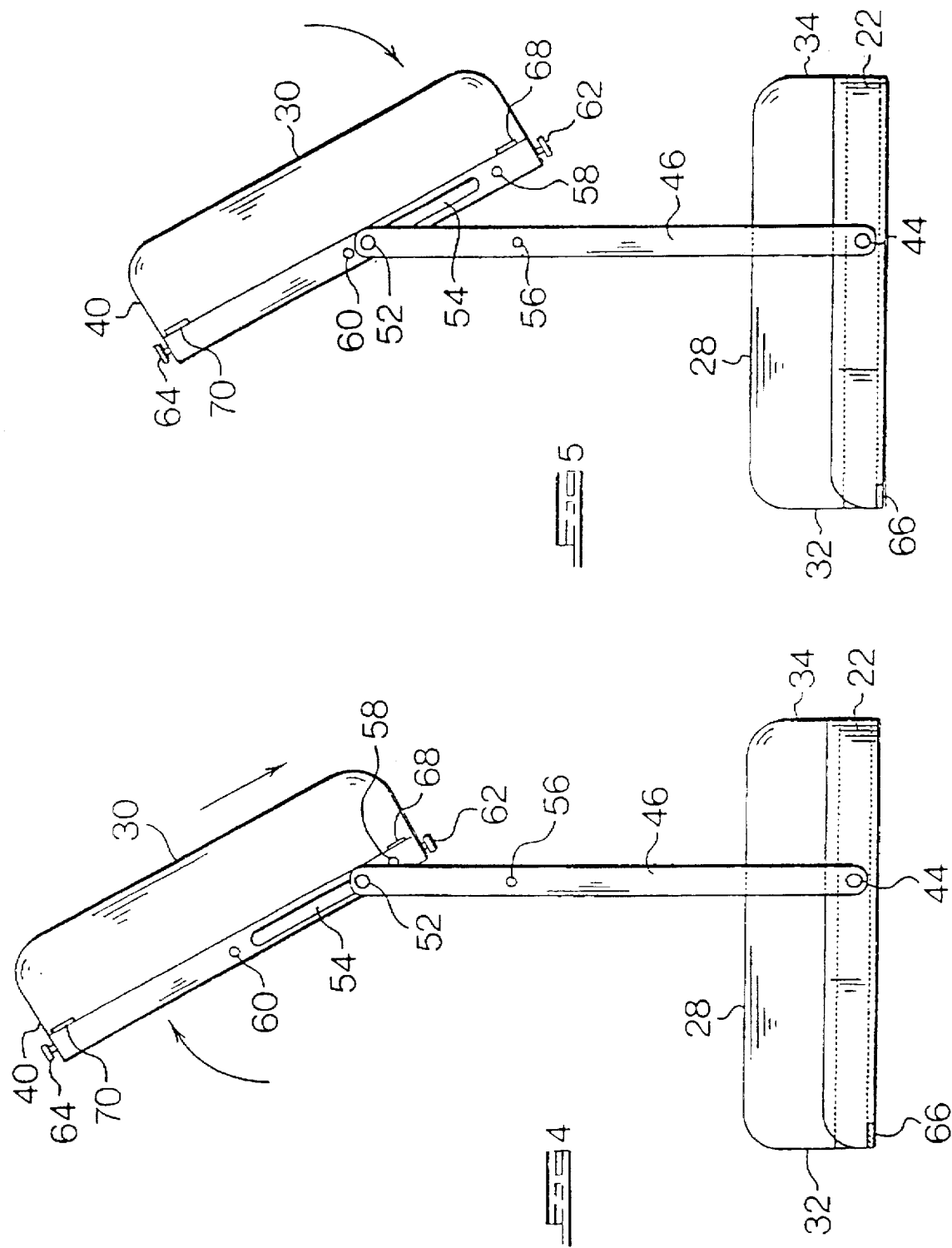

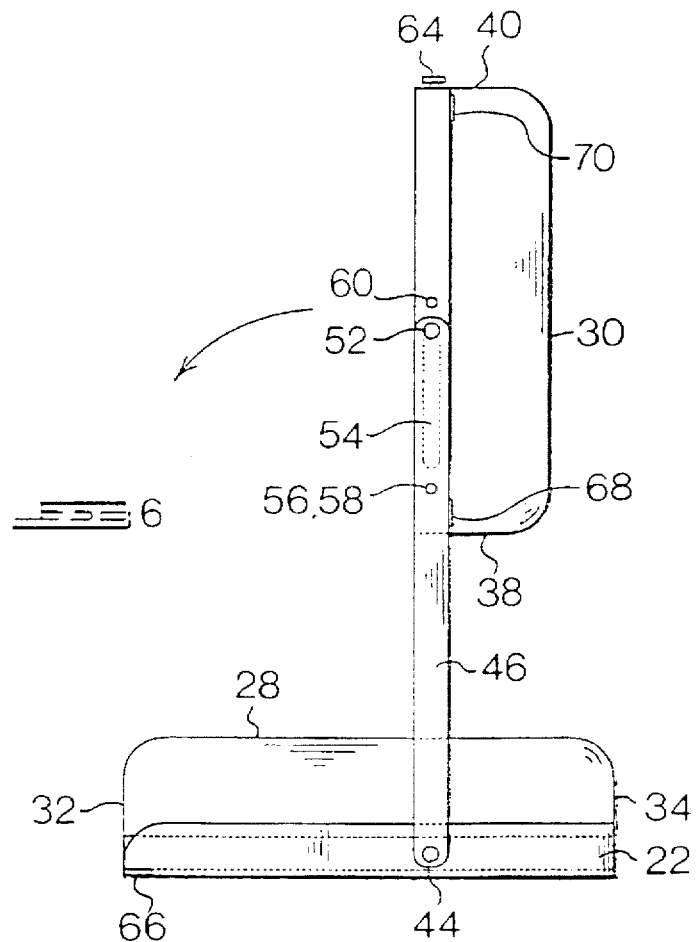
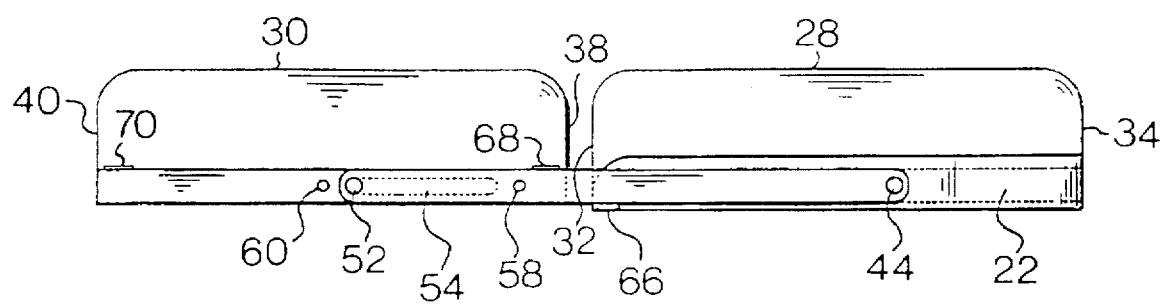

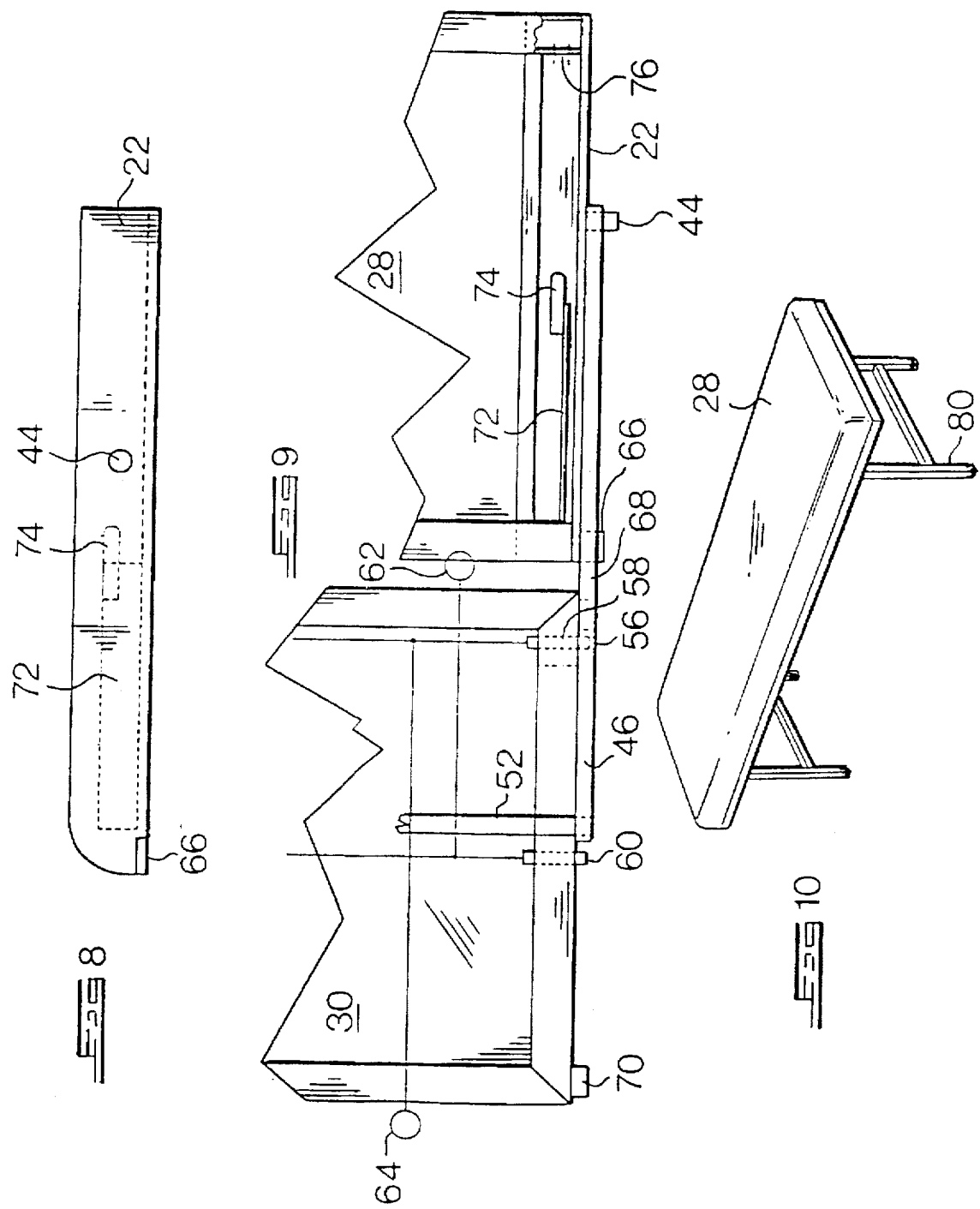

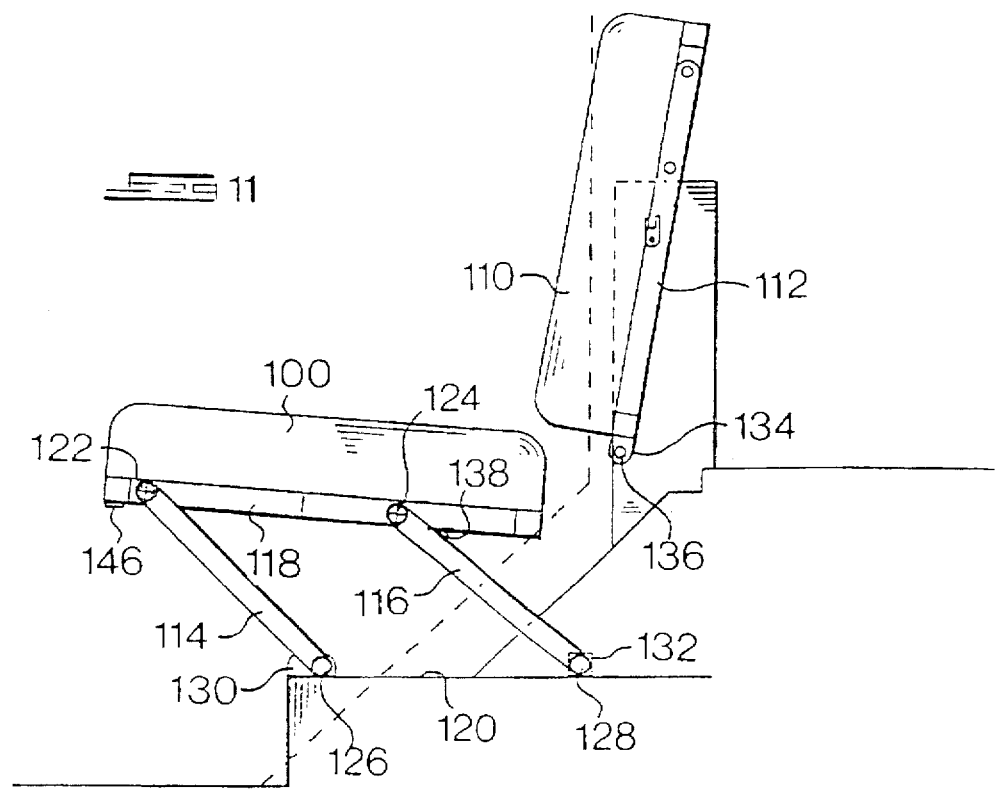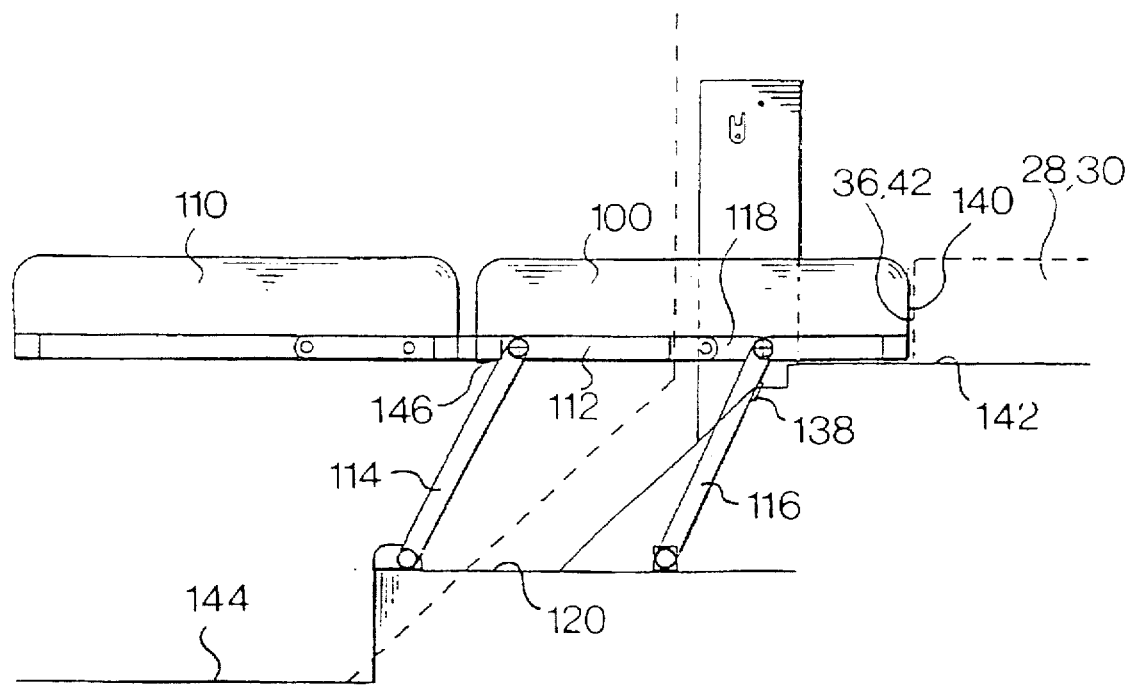

CONVERTIBLE SEATING ARRANGEMENT

BACKGROUND OF THE INVENTION

This invention relates to a seating arrangement which can be configured either as a seat or as a bed.

In a number of applications, it is desirable to provide convertible seating arrangements which convert from a seat to a bed and vice versa. These applications include living quarters where space is at a premium, and vehicles such as those intended for camping or off road use.

It is an object of the invention to provide a seating arrangement which meets the above requirement, while being relatively simple in construction.

SUMMARY OF THE INVENTION

According to the invention, a seating arrangement comprises a seat support means, a seat member having opposed front and rear edges and opposed side edges, and a back member having opposed top and bottom edges and opposed side edges, the seat member being movable on the seat support means between a first, seating position and a second, bed position adjacent to the seating position; the opposed side edges of the back member being mounted pivotally to a pair of arms at respective first ends of the arms, the arms being mounted pivotally on or adjacent to the seat support means respective second ends of the arms so that the back member can be pivoted relative to the arms and the arms can be pivoted relative to the seat support means to move the back member between a first, seating position in which its bottom edge is adjacent the rear edge of the seat member and in which it extends transversely relative to the seat member, and a second, bed position in which its top edge is adjacent the front edge of the seat member and in which the two members are substantially coplanar.

In one embodiment of the invention, the seat support means comprises a pair of track members defining a track in which the seat member is slidable between the first and second positions thereof.

Preferably, the second end of each arm of the pair of arms is mounted pivotally to a respective track member intermediate first and second ends of the track member.

Each track member may include catch means engagable with the seat member when the seat member is moved to its first position, to prevent tipping of the seat member in use.

In a preferred embodiment, the catch means comprises a pin arranged to engage an aperture in a frame of the seat member.

In a second embodiment, the seat support means comprises at least one strut connected pivotally at a first end to the seat member and at a second end to a support structure.

Preferably, the seat support means comprises at least two pairs of struts, the relative lengths and spacing of the struts being selected so that the seat member is inclined relative to the horizontal in the first position thereof.

The back member may comprise a frame mounted pivotally on a rod joining the arms at or adjacent the first ends thereof.

The back member is preferably arranged to pivot through 180° relative to the arms.

The back member may be provided with first and second locating formations arranged to support the back member against the arms in both the first and second positions of the back member.

In a preferred embodiment of the invention, the back member is mounted slidably relative to the arms.

The back member may comprise a frame defining a pair of slots therein which receive the rod joining the arms at or adjacent the first ends thereof, so that the back member can both slide and pivot on the rod.

Locking means may be provided to lock the back member relative to the arms in the first and second positions thereof.

For example, the locking means may comprise locking apertures in the arms and respective sets of retractable locking pins in the back member, operable selectively to lock the back member in the first and second positions thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a side view of one of the seating arrangements of FIG. 1, configured in a seating position;

FIGS. 3, 4, 5, and 6 are similar views to that of FIG. 2, showing a sequence of steps involved in moving the seating arrangement from a seating position to a bed position;

FIG. 7 is a further side view, showing the seating arrangement configured in a bed position, FIG. 8 is a side view of a track member of the seating arrangement, showing details thereof;

FIG. 9 is a fragmentary plan view of the ends of the seat and back members of the seating arrangement together with the track member and a supporting arm of the back member, showing the relationship therebetween;

FIG. 10 is a pictorial view of the seat member removed from the vehicle in which it is normally installed and with its integral legs extended;

FIG. 11 is a side view of a second embodiment of a seating arrangement according to the invention, configured in a seating position; and FIG. 12 is a side view of the second embodiment of the seating arrangement, configured in a bed position.

DETAILED DESCRIPTION OF THE PREFERRED EMBODIMENT

Figure 1:
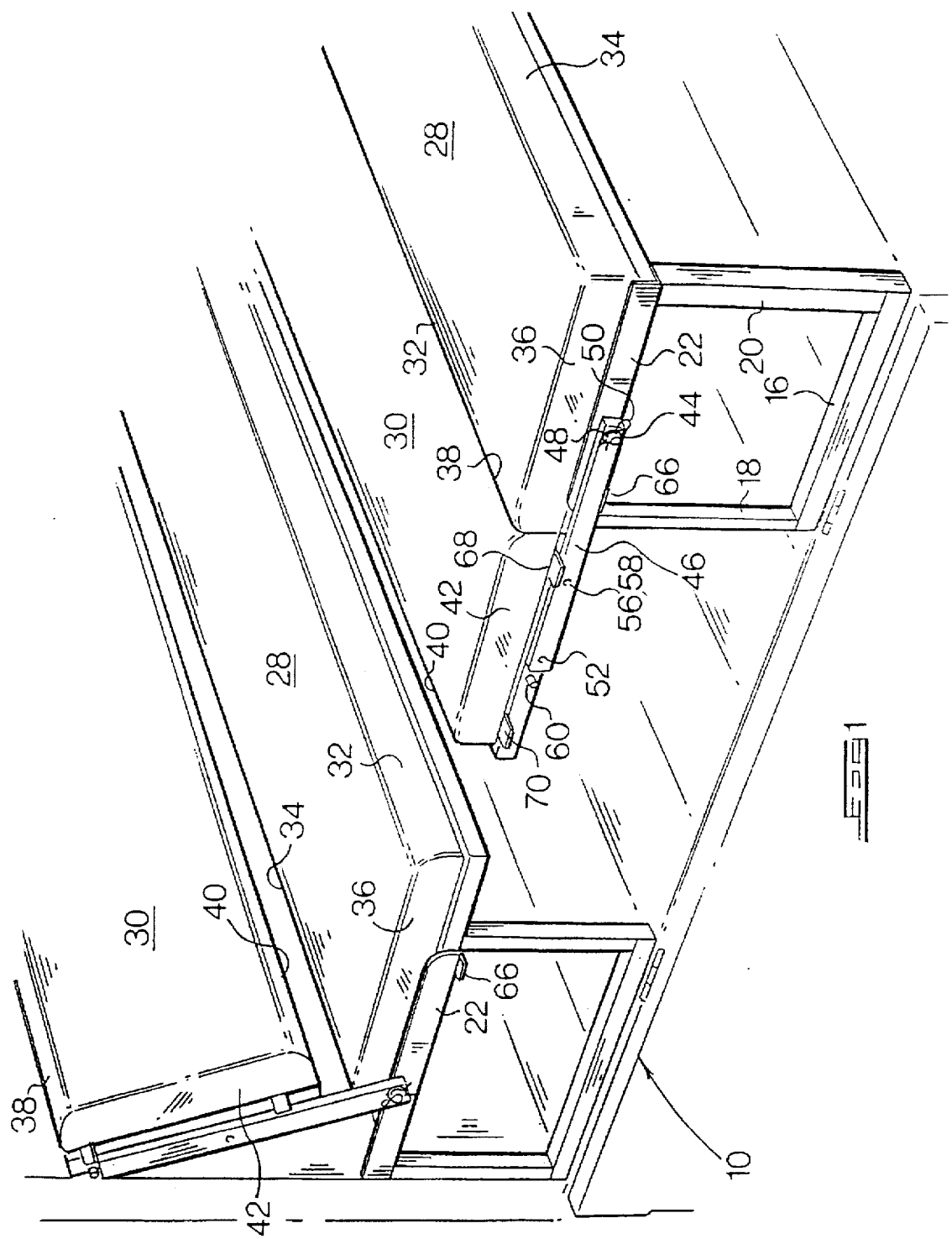
FIG. 1 is a pictorial view of one end of an installation comprising a pair of convertible seating arrangements according to a first embodiment of the invention.

Referring first to FIG. 1, an installation is shown which comprises a pair of convertible seating arrangements according to a first embodiment of the invention, designed to fit into the load bed of a pickup truck or van.

Although only one end of the installation is shown in FIG. 1, the seating arrangements are substantially symmetrical. The installation defines a pair of opposed seats which face one another when they are set up in a seating configuration. It will be appreciated that the invention is not limited to such an arrangement, but applies to both single-seat and multiple-seat arrangements.

Each seating arrangement is supported at opposite sides thereof by respective support frames, each comprising a base 16 and a pair of uprights 18 and 20 of square section metal tubing, which support a track member 22 of heavy duty angle section. The support frames will normally be arranged on either side of the vehicle wheel arches, towards opposite ends of the vehicle load bed. The frames can be bolted or welded into position on the load bed of the vehicle. Alternatively, the frames can be adapted to be removable easily from the vehicle, to restore it to its original condition if necessary.

In some applications, the support frames will not be required, as the vehicle itself provides a suitable support structure for the track members 22. For example, a Land Rover pickup has a box or bench on either side of the load bed, extending the full length thereof, corresponding in height to the depth of the rear wheel arches. In a vehicle such as this, the track members 22 can be mounted directly on the box, with separate support frames being redundant.

Each seating arrangement comprises a squab or seat member 28 and a backrest or back member 30, both of which are generally rectangular in shape. The seat member 28 has opposed front and rear edges 32 and 34 and opposed side edges 36, while the back member has opposed top and bottom edges 38 and 40 and opposed side edges 42.

The back members are constructed from square section tubing defining a frame, with a sheet of rigid material such as metal or board secured to the frame, and a layer of upholstered padding. The seat members are constructed similarly, except that their sides comprise angle sections instead of tubing, for engagement with the track members 22. The seat members 28 can slide fore and aft on the track members 22, between a first, seating position (see the leftmost seat in FIG. 1) and a second, bed position (see the rightmost seat in FIG. 1). In the first position, the front edges 32 of the seat members are extended inwardly towards one another, while in the second position the rear edges 34 of the seat members are moved outwardly and away from one another.

Referring to FIGS. 8 and 9, each track member 22 is seen to comprise an upstanding guide rail 72 which is welded to the lower inner surface of the track member and which is spaced apart from the upright web of the track member by a distance sufficient to receive the web of the angle section forming the side of the frame of the seat member 28. Welded to the rear end of the guide rail 72 is a pin 74 which extends rearwardly and which is aligned with an aperture 76 in the tubular frame member at the rear edge of the seat member 28. When the seat member 28 is extended fully forwardly on the track members 22, the pins 74 of each track member engage the respective apertures 76 at the rear of the seat member's frame, preventing the seat member from tipping forward under the weight of passengers in use. Thus, the pin 74 functions as a catch.

Each back member 30 has a pair of tabs or lugs 68 and 70 which aid in positive location of the back member in use, as described below.

Fixed to the outside of each track member 22 is an outward-facing pin 44 to which is connected pivotally a backrest support arm 46. The arm 46 is retained on the pivot pin 44 by means of a washer 48 and a split pin 50.

Towards the other end of each arm 46 and joining the arms is a sturdy connecting rod 52 which engages, at each side of the back member 30, an elongated slot 54 formed in a respective side of the metal frame of the back member. The rod 52 is slidable in the slots 54, so that the back member can both pivot and slide relative to the arms 46.

Intermediate the ends of each arm 46, approximately one third the length of the arm away from the rod 52, is an aperture 56 which can receive either a first retractable locking pin 58 (when the seating arrangement is configured as a bed), or a second retractable locking pin 60 (when the seating arrangement is configured as a seat). The pins 58 and 60 are housed in the sides of the frame of the back member 30 and can move between extended positions in which they extend transversely outwardly from the frame, and retracted positions in which their ends are flush with the edges of the frame. The locking pins 58 are spring biased into their extended positions and can be retracted by an actuator 64 (typically a knob or pull cord). Similarly, the pins 60 are operated by an actuator 62. (The actuators 62 and 64 are indicated schematically in FIG. 9.)

Referring now to FIGS. 2 to 7, the operation of a single seating arrangement will be described in greater detail. In FIG. 2, the seating arrangement is configured as a seat, with the seat member 28 extended forward on the track members 22. In this extended position, the seat member 28 is prevented from tipping forward under the weight of a passenger by the catch mechanism illustrated in FIGS. 8 and 9 and described above.

The back member 30 is arranged with the rod 52 at the ends of the arms 46 at the outermost ends of the slots 54 in the frame of the back member, and with the locking pins 60 engaged with the respective apertures 52 in the arms 46. The arms 46 are pivoted away from the plane of the seat member 28 so that the back member 30 extends transversely and at an obtuse angle relative to the seat member, and the upper portions of the arms 46 and the back member 30 rest against the side of the vehicle. Tabs or lugs 70 extending outwardly from the sides of the frame of the back member rest against the respective arms 46, supporting the lower end of the back member. A catch can be provided to hold the back member in its upright seating position, so that it does not fall forward unexpectedly.

In the above described configuration, the seating arrangement functions as a comfortable seat.

When it is desired to convert the seating arrangement into a bed, the seat member 28 is first pushed fully backwards on the track members 22, in the direction of the arrow in FIG. 2, to the position shown in FIG. 3. The actuator 62 is then operated to retract the locking pin 60, freeing the back member 30 and allowing its lower edge 40 to pivot upwardly and away from the arm 46 in the direction of the arrows in FIGS. 3 and 4. From the position shown in FIG. 4, the back member slides downwardly under its own weight so that the rod 52 at the outer ends of the arms 46 slides to the innermost ends of the respective slots 54, as shown in FIG. 5. Rotation of the back member continues in the direction of the arrow in FIG. 5, until the retractable locking pin 58 is adjacent the aperture 56. At this point, the back member 30 will have been rotated about the pin 52 through almost 180°.

The second actuator 64 is operated to retract the locking pin 58, allowing the seat member 30 to be moved through the final few degrees of its rotation, and is then released to engage the aperture 56, so that the back member is locked in position on the arm 46, with its orientation reversed and being shifted upwardly away from the seat member 28 by a distance corresponding to the length of the slot 54 (see FIG. 6). In this configuration, outwardly extending tabs or lugs 68 on either side of the back member rest against the respective arms 46, supporting the seat member thereon.

The arms 46 and the back member 30, which are now again locked together, are now lowered in the direction of the arrow in FIG. 6 until each arm 46 rests on a lug or tab 66 which extends transversely outwardly from the lower edge of each track member 22, as shown in FIG. 7. In this second, bed configuration, the seat member and the back member are substantially coplanar and are adjacent one another, so that they define a flat sleeping surface. In the dual-seat arrangement shown in FIG. 1, the sizes of the seat and back members of the two seat arrangements are chosen so that the respective lower edges of the back members 30 abut one another when the two seat arrangements are configured in the bed position, thus defining a relatively large and essentially uninterrupted sleeping surface.

It will be appreciated that when a pair of seating arrangements of the invention are arranged opposite one another on the load bed of a vehicle, as in FIG. 1, the range of possible widths of the back and seat members is determined by the width of the load bed. With a load bed having a width of 1.4 m, it is convenient to make the seat and back members of equal size, that is, about 350 mm wide. Where the load bed is substantially larger, it may be undesirable to increase the width of the back members substantially, as this increases their mass and makes them more difficult to handle. Instead, the width of the seat members can conveniently be increased, with the position of the pivot pin 44 on each track member 22 being adjusted if necessary so that the front edge 32 of the seat member is located correctly relative to the back member 30 when the latter is in its upright, seating position. The rear edge 34 of the seat member will, in such an arrangement, extend below or beyond the bottom edge 40 of the back member.

As shown in FIG. 10, each seat member 28 has a pair of folding H-shaped legs 80 fixed to its underside by a bracket (not shown). If the seat member 28 is lifted up and out of the track defined by the track members 22 (before engaging the pins 74) the seat members are easily converted into free standing seats of a conventional nature which are useful when camping, for example.

It will be appreciated from the above description that the described seating arrangement is relatively simple and robust in construction, and also relatively easy to move between its seating and bed configurations. It will be appreciated that the described arrangement is also flexible, allowing the seating arrangement to be adapted to vehicles of different size by varying the relative widths of the seat and back members, the position of the pivot pins 44, and the position and length of the slot 54 in each arm 46.

It is a particular advantage of the present invention that there are no levers, arms or other mechanisms which extend above the upper surfaces of the back and seat members in their bed configuration, which makes it possible to place two or more of the seating arrangements side by side to define a large sleeping surface which is uninterrupted.

In the above described embodiment, the seating arrangement was designed to be fitted to the load bed of a vehicle. In other applications, it might be necessary to provide a frame which can be fastened to the ground or to a wall, or the arrangement could be completely free standing. The design of the frame (if any) of the seating arrangement can be adjusted according to the intended application, as can the shape and size of the seat and back members.

FIGS. 11 and 12 illustrate an alternative embodiment of the invention which, in a prototype installation, was used together with the first embodiment. The second embodiment was installed in place of the conventional rear seat in a Land Rover station wagon, with the above described embodiment being installed in the rear of the vehicle.

The embodiment of FIGS. 11 and 12 comprises a seat member 100 and a back member 110 supported on a pair of arms 112 in much the same manner as described above. However, instead of being mounted for fore and aft sliding movement on a track, the seat 100 is mounted on pairs of struts 114 and 116, each of which is pivoted at its respective upper and lower ends to the frame 118 of the seat member and the body 120 of the vehicle. The struts 114 and 116 are of unequal length, with the strut 116 being slightly shorter than the strut 114. In addition, bolts 122 and 124 which fasten the respective struts pivotally to the seat frame 118 are spaced slightly closer together than bolts 126 and 128 which secure the lower ends of the struts pivotally to respective brackets 130 and 132 on the vehicle floor.

The lower end 134 of each arm 112 is mounted pivotally on a bolt or pin 136 fitted to a side pillar of the vehicle, and the operation of this embodiment of the seating arrangement is similar to that described above for the first embodiment.

It will be noted that, in the seating configuration shown FIG. 11, the frame 118 of the seat member 100 rests against tabs or lugs 138 fixed to the rear struts 116. The lengths of the struts and the locations of their pivot points are chosen so that, in the seating position, the seat member 100 is tilted backwards slightly as shown, providing a comfortable sitting position for a passenger with its upper surface inclined relative to the horizontal.

When the seat member 100 is moved rearwardly, its rear end 140 extends slightly on to the load bed 142 of the vehicle, adjacent to the innermost side edges 36 and 42 of the previously described seating arrangement, which is located on the load bed. The back member 110 extends substantially coplanar with the seat member 100 in the bed position illustrated in the position illustrated in FIG. 11, over the rear footwell 144 of the vehicle, with the arms 112 supported by lugs or tabs 146 fixed to the seat frame 118.

The above described second embodiment of the invention lends itself to installation in the place of a conventional rear seat of a vehicle, and is particularly advantageous when combined with the first embodiment, installed as described above, since the arrangement then provides a large, essentially flat sleeping area.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A seating arrangement comprising:

seat support means, a seat member having opposed front and rear edges and opposed side edges, and a back member having opposed top and bottom edges and opposed side edges, the seat member being movable on the seat support means between a first, seating position and a second, bed position adjacent to the seating position;

the opposed side edges of the back member being mounted pivotally to a pair of arms at respective first ends of the arms, the arms being mounted pivotally to the seat support means at respective second ends of the arms so that the back member can be pivoted relative to the arms and the arms can be pivoted relative to the seat support means to move the back member between a first, seating position in which its bottom edge is adjacent the rear edge of the seat member and in which it extends transversely relative to the seat member, and a second, bed position in which its top edge is adjacent the front edge of the seat member and in which the two members are substantially coplanar, the arms including adjustment means for adjusting the position of the back member relative to the arms, independent of the position of the arms.

2. The seating arrangement according to claim 1, wherein the back member is mounted slidably relative to the arms.

3. The seating arrangement according to claim 1, wherein the back member is arranged to pivot through 180° relative to the arms.

4. The seating arrangement according to claim 1, wherein the back member is provided with first and second locating formations arranged to support the back member against the arms in both the first and second positions of the back member.

5. The seating arrangement according to claim 1, wherein the back member comprises a frame mounted pivotally on a rod joining the arms adjacent the first ends thereof.

6. The seating arrangement according to claim 5, wherein the back member is arranged to pivot through 180° relative to the arms.

7. The seating arrangement according to claim 6, wherein the back member is provided with first and second locating formations arranged to support the back member against the arms in both the first and second positions of the back member.

8. A seating arrangement comprising seat support means, a seat member having opposed front and rear edges and opposed side edges, and a back member having opposed top and bottom edges and opposed side edges, the seat member being movable on the seat support means between a first, seating position and a second, bed position adjacent to the seating position;

the opposed side edges of the back member being mounted pivotally to a pair of arms at respective first ends of the arms, the arms being mounted pivotally to the seat support means at respective second ends of the arms so that the back member can be pivoted relative to the arms and the arms can be pivoted relative to the seat support means to move the back member between a first, seating position in which its bottom edge is adjacent the rear edge of the seat member and in which it extends transversely relative to the seat member, and a second, bed position in which its top edge is adjacent the front edge of the seat member and in which the two members are substantially coplanar, wherein the seat support means comprises a pair of track members defining a track in which the seat member is slidable between the first and second positions thereof.

9. The seating arrangement according to claim 8, wherein the second end of each arm of the pair of arms is mounted pivotally to a respective track member intermediate first and second ends of the track member.

10. The seating arrangement according to claim 8, wherein each track member includes catch means engagable with the seat member when the seat member is moved to its first position, to prevent tipping of the seat member in use.

11. The seating arrangement according to claim 10, wherein the catch means comprises a pin arranged to engage an aperture in a frame of the seat member.

12. A seating arrangement comprising seat support means, a seat member having opposed front and rear edges and opposed side edges, and a back member having opposed top and bottom edges and opposed side edges, the seat member being movable on the seat support means between a first, seating position and a second, bed position adjacent to the seating position;

the opposed side edges of the back member being mounted pivotally to a pair of arms at respective first ends of the arms, the arms being mounted pivotally to the seat support means at respective second ends of the arms so that the back member can be pivoted relative to the arms and the arms can be pivoted relative to the seat support means to move the back member between a first, seating position in which its bottom edge is adjacent the rear edge of the seat member and in which it extends transversely relative to the seat member, and a second, bed position in which its top edge is adjacent the front edge of the seat member and in which the two members are substantially coplanar, wherein the back member comprises a frame mounted on a rod joining the arms adjacent the first ends thereof, and wherein the back member is mounted slidably relative to the arms.

13. The seating arrangement according to claim 12, wherein the back member comprises a frame defining a pair of slots therein which receive the rod joining the arms adjacent the first ends thereof, so that the back member can both slide and pivot on the rod.

14. A seating arrangement comprising seat support means, a seat member having opposed front and rear edges and opposed side edges, and a back member having opposed top and bottom edges and opposed side edges, the seat member being movable on the seat support means between a first, seating position and a second, bed position adjacent to the seating position;

the opposed side edges of the back member being mounted pivotally to a pair of arms at respective first ends of the arms, the arms being mounted pivotally to the seat support means at respective second ends of the arms so that the back member can be pivoted relative to the arms and the arms can be pivoted relative to the seat support means to move the back member between a first, seating position in which its bottom edge is adjacent the rear edge of the seat member and in which it extends transversely relative to the seat member, and a second, bed position in which its top edge is adjacent the front edge of the seat member and in which the two members are substantially coplanar, wherein locking means are provided to lock the back member relative to the arms in the first and second positions thereof.

15. The seating arrangement according to claim 14, wherein the locking means comprises locking apertures in the arms and respective sets of retractable locking pins in the back member, operable selectively to lock the back member in the first and second positions thereof.

* * * * *